J. W. VANDERVEER.
CAN BODY MAKING MACHINE.
APPLICATION FILED SEPT. 18, 1912.

1,185,558.

Patented May 30, 1916.
7 SHEETS—SHEET 1.

Fig-1-

WITNESSES:
Chas H. Young
S. Davis

INVENTOR
Jewell W. Vanderveer
BY
Parsons Hall Bodell
ATTORNEYS

J. W. VANDERVEER.
CAN BODY MAKING MACHINE.
APPLICATION FILED SEPT. 18, 1912.

1,185,558.

Patented May 30, 1916.
7 SHEETS—SHEET 2.

WITNESSES:
Chas. H. Young
L. M. Buxton

INVENTOR
Jewell W. Vanderveer
BY
Parsons Hall Bodee
ATTORNEYS

J. W. VANDERVEER.
CAN BODY MAKING MACHINE.
APPLICATION FILED SEPT. 18, 1912.

1,185,558.

Patented May 30, 1916.
7 SHEETS—SHEET 4.

WITNESSES:
Chas. F. Young.
L. M. Burton.

INVENTOR
Jewell W. Vanderveer
BY
Parsons Hall Boler.
ATTORNEYS

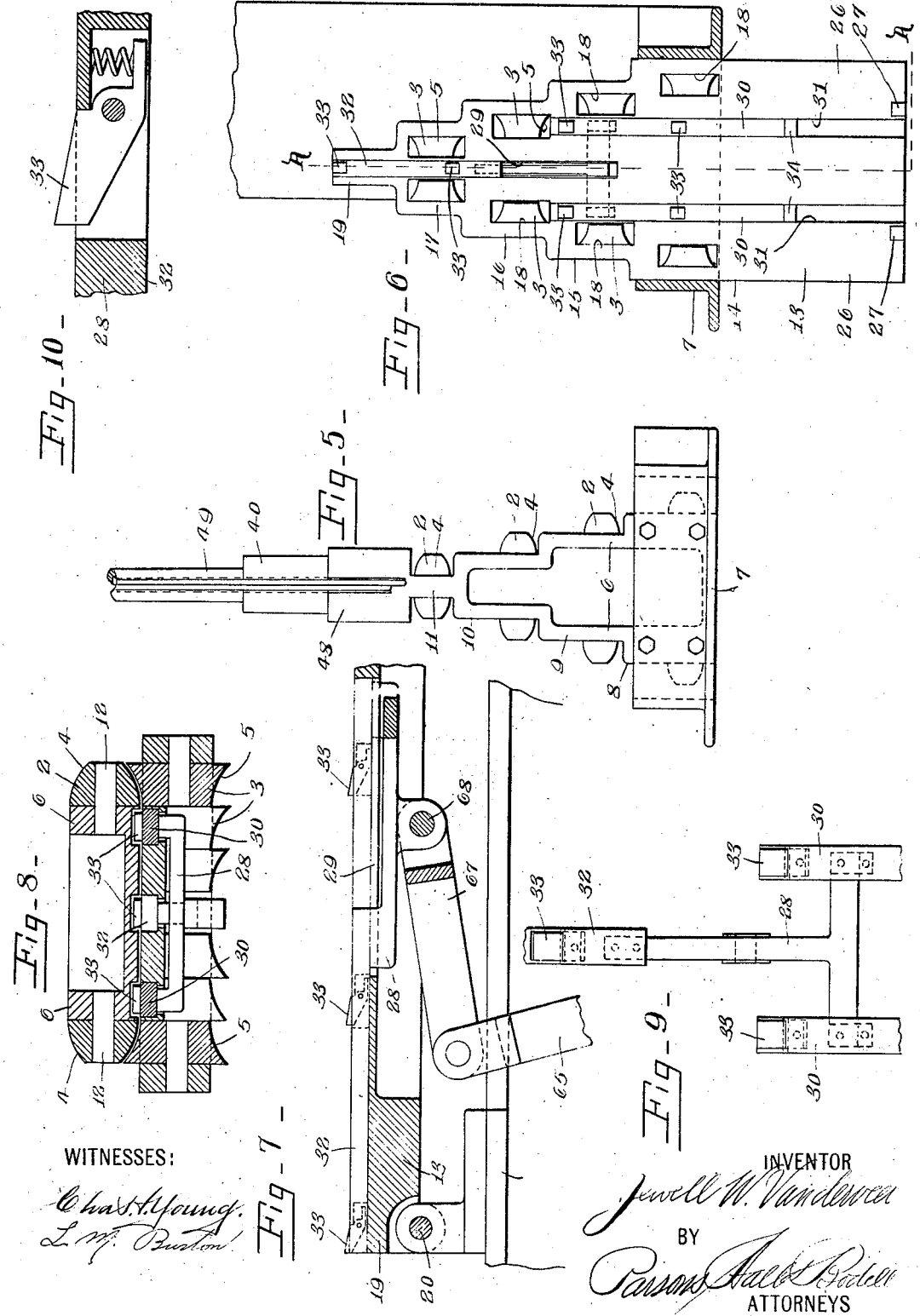

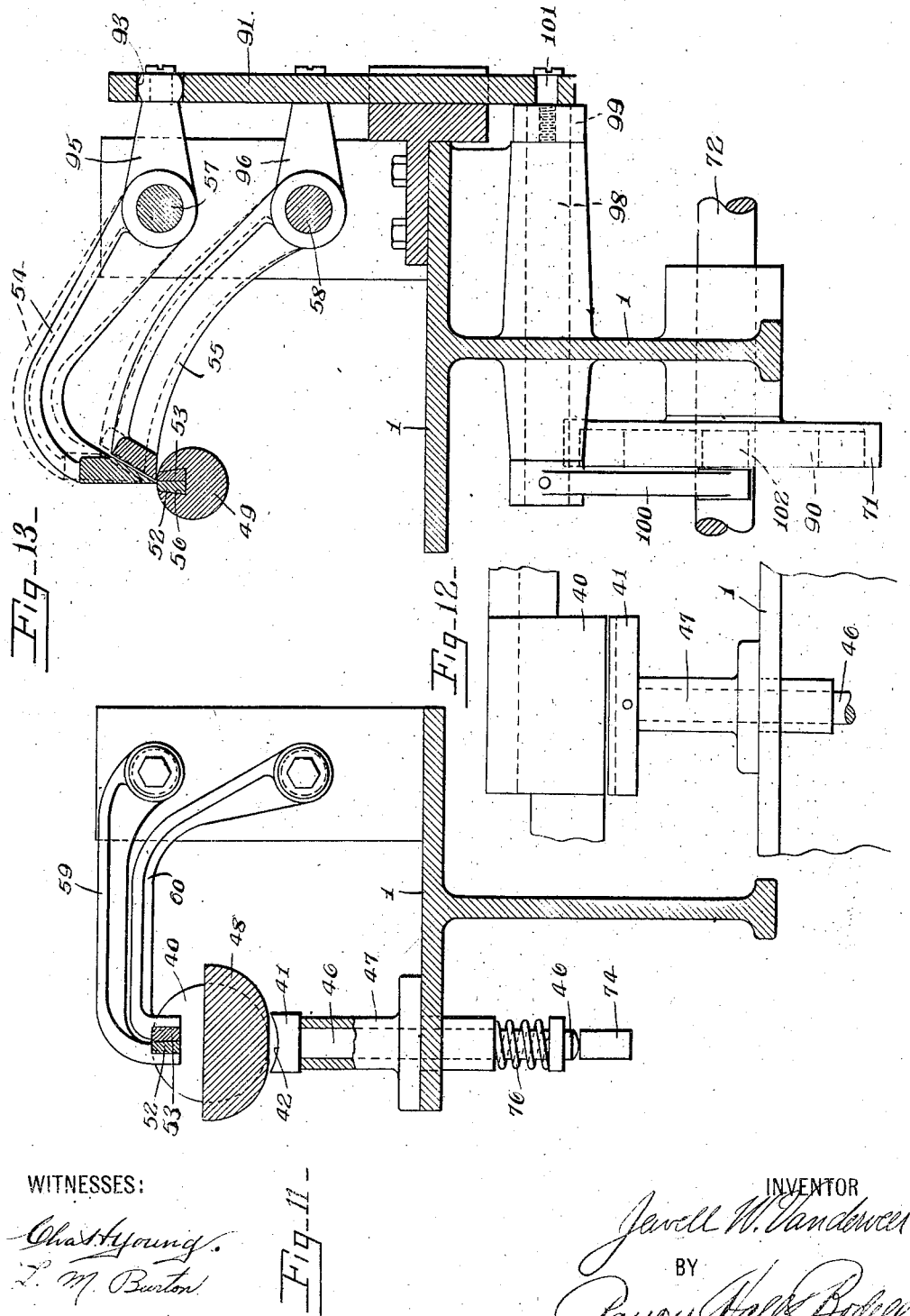

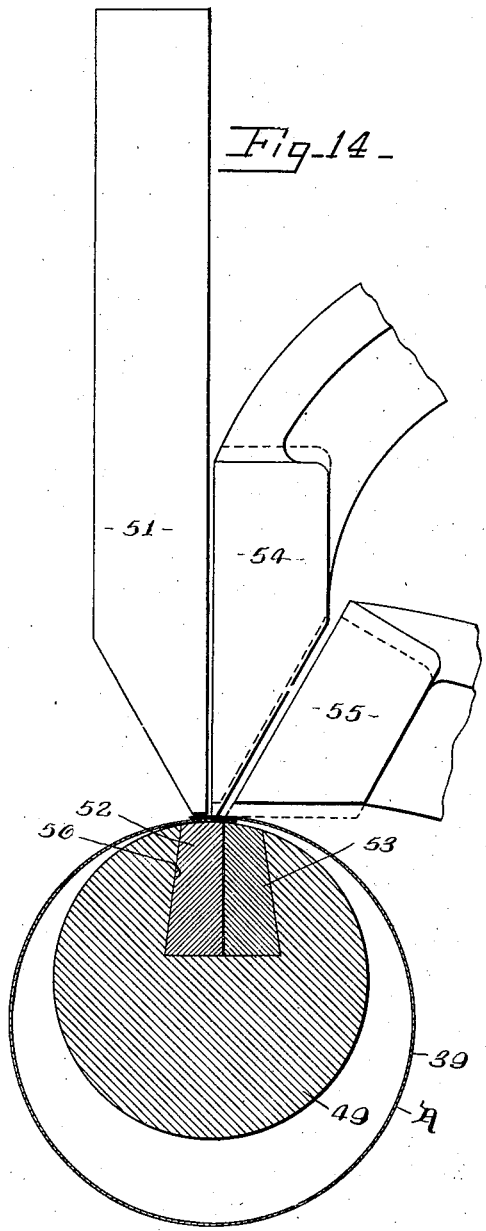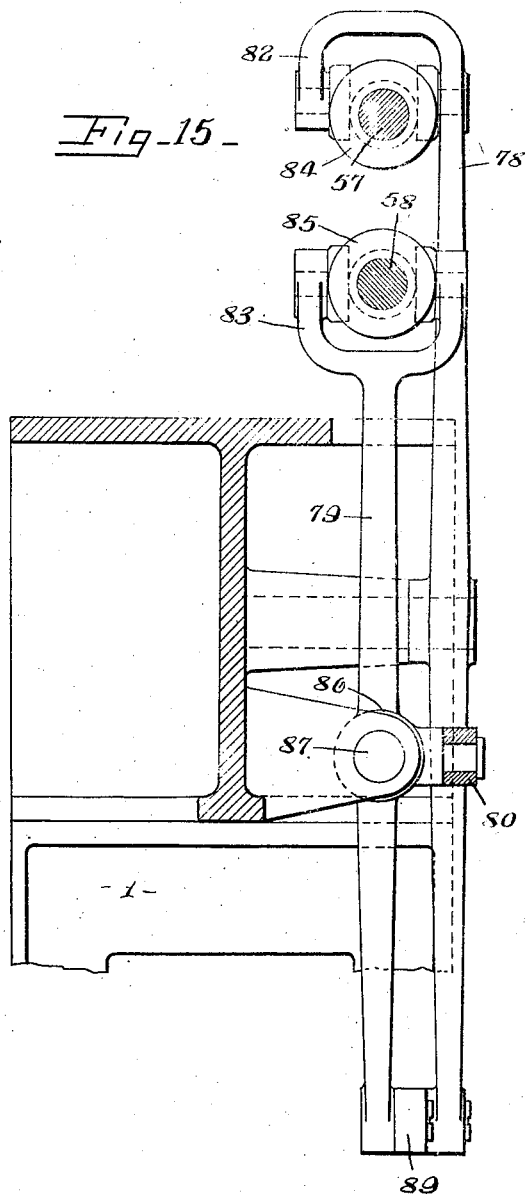

UNITED STATES PATENT OFFICE.

JEWELL W. VANDERVEER, OF BALDWINSVILLE, NEW YORK, ASSIGNOR OF ONE-HALF TO CHARLES BRATT, OF SYRACUSE, NEW YORK.

CAN-BODY-MAKING MACHINE.

1,185,558.      Specification of Letters Patent.      Patented May 30, 1916.

Application filed September 18, 1912. Serial No. 720,989.

*To all whom it may concern:*

Be it known that I, JEWELL W. VANDERVEER, of Baldwinsville, in the county of Onondaga and State of New York, have invented a new and useful Can-Body-Making Machine, of which the following is a specification.

This invention has for its object a can body making machine which is particularly simple in construction and highly efficient and durable in use; and it consists in the combinations, constructions and novel features hereinafter set forth and claimed.

In describing this invention reference is had to the accompanying drawings in which like characters designate corresponding parts in all the views.

Figure 1:
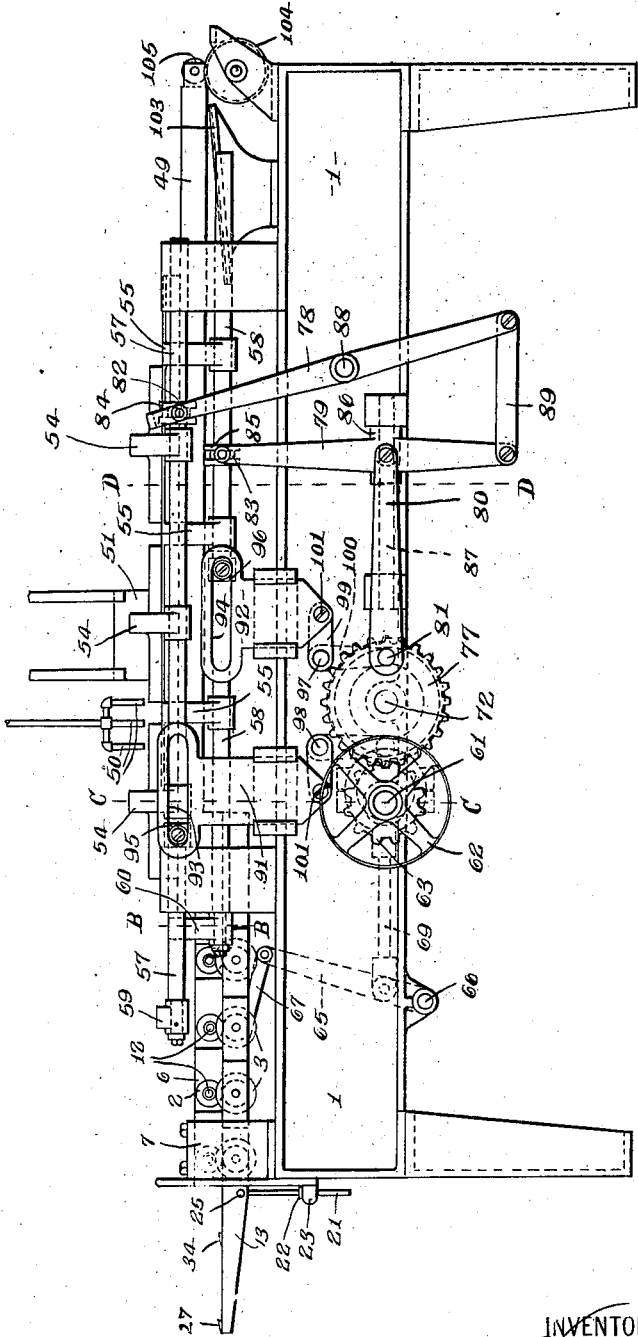
Figures 2, 16:
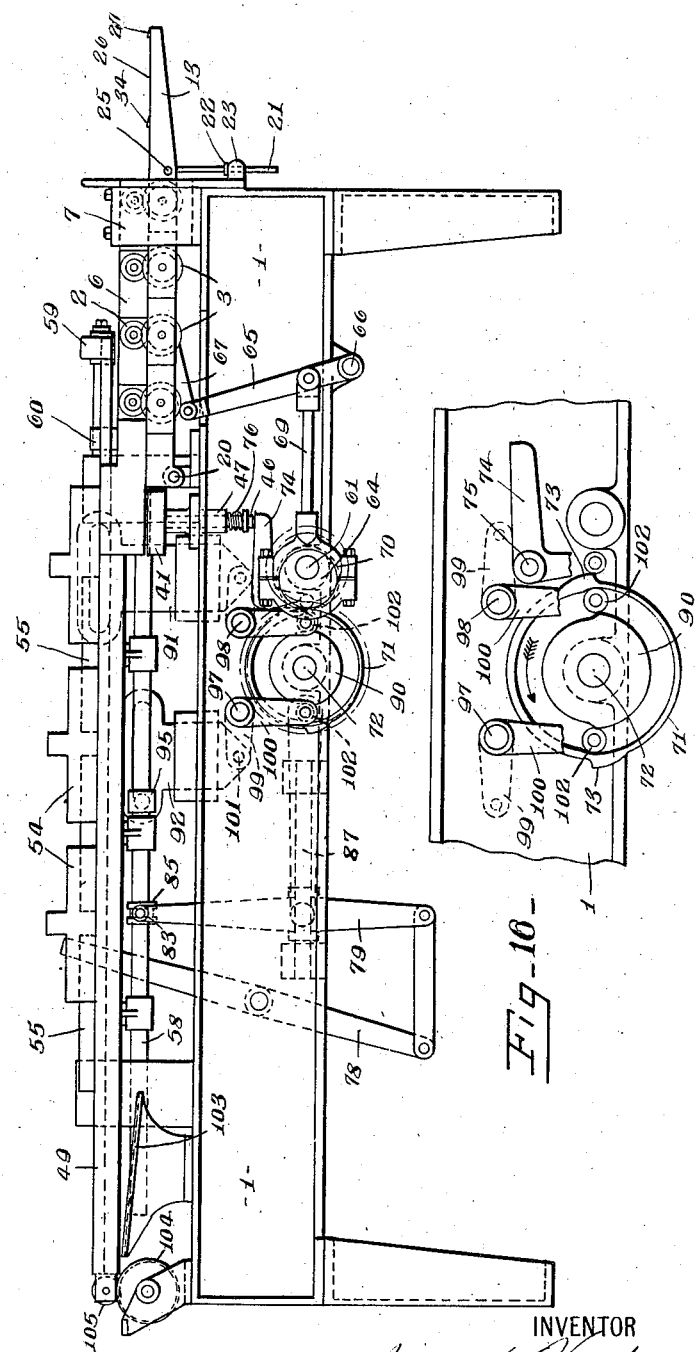
Figure 3:
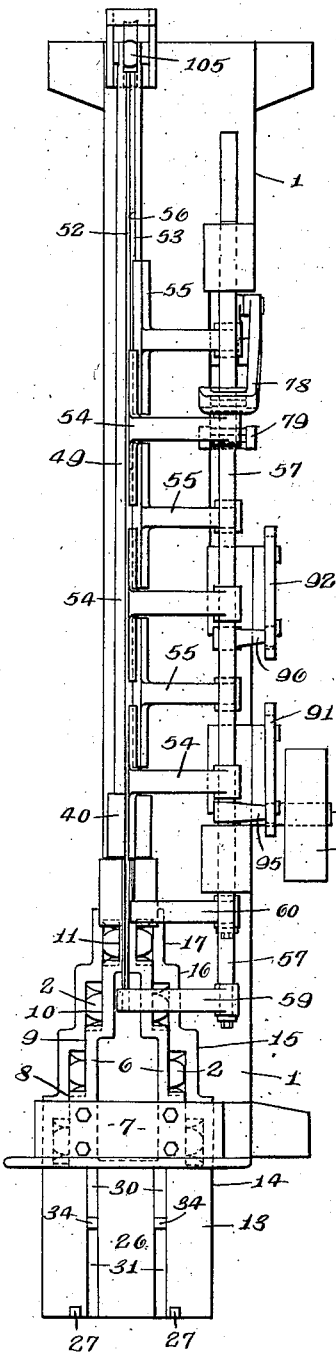
Figure 17:
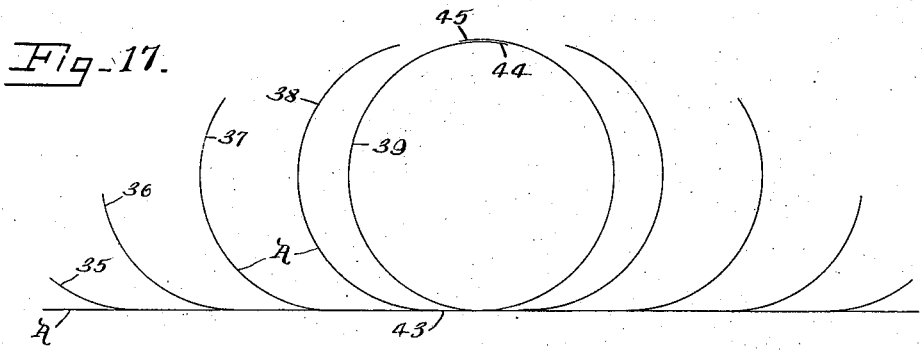
Figure 4:
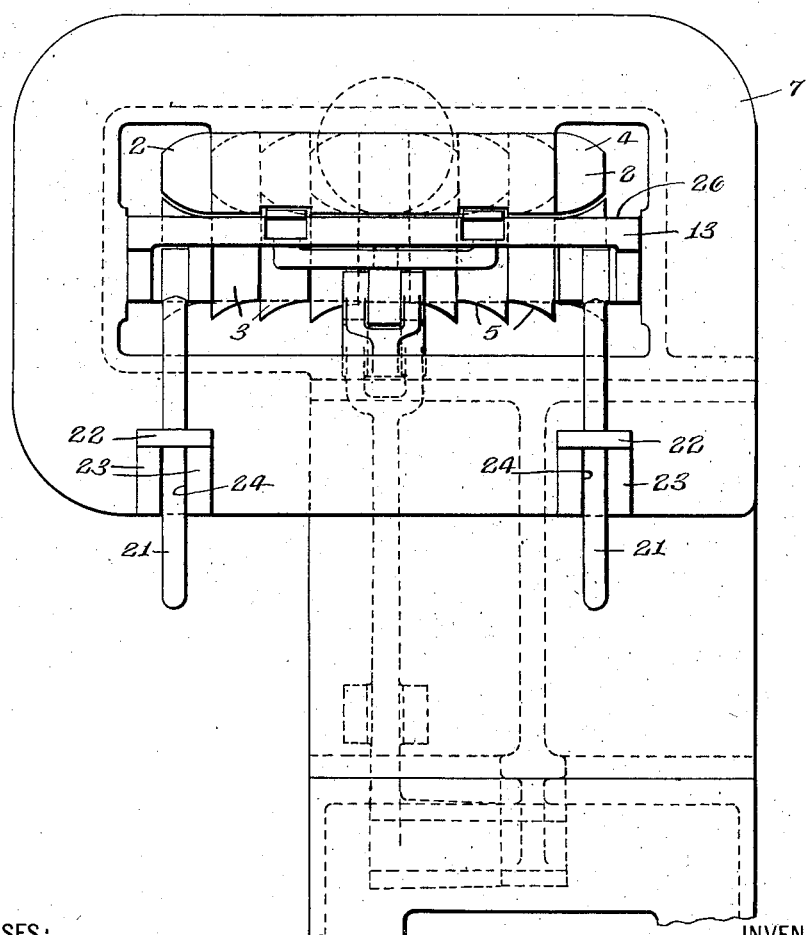

Figures 1, 2 and 3 are respectively opposite side elevations and a plan of this machine. Fig. 4 is an enlarged end elevation looking to the right in Fig. 1, parts being omitted and parts being broken away. Figs. 5 and 6 are plan views of die members and associated parts, the contiguous part of the horn being shown in Fig. 5, and the adjacent part of the frame being shown in Fig. 6. Fig. 7 is a longitudinal sectional view on line "A—A", Fig. 6. Fig. 8 is a cross sectional view of the parts assembled, shown unassembled in Figs. 5 and 6, and assembled in end elevation in Fig. 4. Fig. 9 is a detail view, partly broken away, of the feeding carriage. Fig. 10 is an enlarged detail view of one of the pawls associated with the feeding carriage. Fig. 11 is a cross sectional view, parts being omitted, taken on the plane of line "B—B", Fig. 1, illustrating the means for performing the last step in the forming of the can body. Fig. 12 is an elevation looking to the right, of parts seen in Fig. 11. Fig. 13 is an enlarged sectional view, parts being omitted, taken on line of "C—C", Fig. 1, illustrating the gripping elements and coacting parts. Fig. 14 is an enlarged detail view illustrating the horn in cross section, with the formed can body thereon, the soldering iron and the gripping elements for feeding the can body along the horn after being soldered. Fig. 15 is a sectional view taken on the plane of line "D—D", Fig. 1, parts being omitted, illustrating a portion of the means for actuating the gripping elements. Fig. 16, sheet 2, is a detail view of a portion of the power-transmitting means between the main shaft and movable parts of this machine, the contiguous part of the frame of the machine being also shown. Fig. 17 is a diagrammatic view illustrating the forms a blank assumes during the various steps in the formation of the can body.

This can making machine comprises, generally, means for forming the can body from a flat blank, means for soldering the lapped edges of the formed blank, means for feeding the can bodies after being soldered, and removing the same from the machine after the solder has set, and means for actuating the movable parts of the machine.

The mechanisms of this machine are supported on a suitable bed or frame 1 which may be of any desirable form, size and construction.

The means for forming the can bodies from flat blanks comprises die members having complemental opposing surfaces extending in a general direction at an angle to the plane of the flat blank and constituting a contracting passage which operates to contract the blank from its side portions toward its median line, from a flat toward closed form. Said opposing surfaces are preferably concave and convex so that the can body will be cylindrical.

The die members are arranged in sets located successively one in advance of the other, each set comprising preferably opposing rollers 2, 3, substantially conoidal in form and usually having concave and convex surfaces 5, 4 arranged to engage side portions of the blank as A. Each set of rollers is preferably, for economy in manufacturing, composed of a plurality of pairs of rollers spaced apart, instead of consisting of but one pair of elongated rollers, and each successive set of rollers is of shorter length than the first or the preceding set, so as to engage the blank nearer the median than the first or the preceding set, the first set engaging the blank near the side edges of the blank and the second set engaging the portion adjacent that flexed by the first set, etc.

The convex and concave faces 4, 5 of the sets of rollers are in this embodiment of my invention, shown as of the same curvature, as the machine here shown is intended to form cylindrical can bodies. However, the faces 4, 5, of the different sets may be of different inclinations or curvatures for forming can bodies of different contour than cylindrical.

The rollers 2 of each set, which are provided with convex faces 4, are supported by a suitable carriage 6, Figs. 1, 2, 5 and 8, fixed to the frame 1 by means of a yoke 7 located at one end of the frame, Figs. 1, 2, 3, 4 and 5, this carriage 6 being provided with portions 8, 9, 10 and 11 of different widths from which extend laterally extending trunnions as 12 upon which the rollers 2 are mounted. The rollers 3 are mounted upon a carriage 13, Figs. 1, 2, 3, 6 and 8, the carriage 13 being formed with portions 14, 15, 16 and 17 of different widths, each of said portions being formed with slots 18 in which the rollers 3 are mounted on trunnions similar to the trunnions 12, the carriage terminating at its inner end in a narrow central lengthwise projection 19 for a purpose to be described.

The carriage 13 is pivoted at its inner end at 20, Figs. 2 and 7, to the bed 1 of the machine, is movable about its pivot relatively to the carriage 6, and is held in its normal position by rods 21, Figs. 1, 2 and 4 located at one end of the machine and having shoulders as 22 engaging the upper sides of lugs 23 provided on a depending portion of the yoke 7. The lugs are formed with slots 24 on their front sides through which the rods 21 can be moved in order to permit the carriage 13 to be lowered on its pivot 20 in order to remove a blank that has become jammed between the rollers 2, 3. The rods 21 are pivoted at 25 at their upper ends to the carriage 13 in order to permit their disengagement from the lugs 23. The carriage 13 also includes an apron portion 26 having fixed gages 27 against which the blank is placed when being fed in the machine.

The means for feeding the blanks between the rollers 2, 3, includes a movable carriage 28, Figs. 7 and 9, the carriage reciprocating and comprising an intermediate body portion sliding below the upper face of the carriage 13 and working in a slot 29 in such carriage, a pair of arms or slides 30 extending from one end of the body and working in grooves 31 in the upper face of the apron 26 and a single slide or guide 32 extending centrally from the other end thereof and working in a groove in the front end projection 19 of the carriage 13.

The slides 30 and 32 are provided with spring-pressed ratcheting parts or pawls 33, Fig. 10, arranged in sets one in advance of the other to engage the rear edges of the blanks and feed the same between the rollers as hereinafter set forth, and the slides 30 are provided with fixed shoulders 34 at their ends for engaging the rear edge of the blank on the apron 26 and carrying the same from the gages 27 into position to be engaged by the first set of pawls 33 during the next reciprocation of the carriage 28. It is not necessary that the shoulders 34 ratchet as the blank when placed on the apron 26 against the gages 27, overlies said shoulders 34.

The carriage 28 is reciprocated by suitable power-transmitting means connected to the actuating mechanism for the movable parts as hereinafter described.

The rollers 2, 3 engage the blank successively near its side edges toward the intermediate portion, which intermediate portion remains substantially flat, the successive steps of the rollers being illustrated diagrammatically in Fig. 17 by lines designated respectively 35, 36, 37, 38 and 39.

From the form illustrated at 38 which approaches cylindrical form, the partly formed can body is fed between two die members 40, 41, Figs. 11 and 12, for bringing together the edges of the partly formed can body 38, the die members having relative movement toward and from each other. The die member 40 is substantially cylindrical and the die member 41 is a head having a concave face 42 arranged to engage the flat intermediate portion 43 of the partly formed can body 38 and flex the same, so that the edges of the partly formed can body are lapped as indicated at 44 and 45, Fig. 17. The die member 40 is rigid with the carriage 6, Fig. 5.

The head 41 is carried by a plunger 46 slidable in a vertical guide 47, Figs. 2 and 11, and is actuated as hereinafter described. A spreading means 48, Figs. 5 and 11, is arranged in advance of the die member 40 for holding the side edges of the partly formed can body 38 separated, so that they will not foul on other parts of the machine contiguous to the die member 40.

In the operation of the machine as thus far described, the flat blank is placed on the apron 26 of the carriage 13 against the gages 27, and during the reciprocation of the feeding carriage 28, the fixed shoulders 34 on the slides 30 of said carriage 28, engage the rear edge of the first blank and feed the same along the apron into position to be engaged by the first set of pawls 33 upon the next reciprocation of the carriage 28, from whence they are fed by the first set of pawls 33 between the first set of rollers 2, 3 which bend the blank into the blank 35, Fig. 17. Upon the third reciprocation of the carriage 28, the first set of pawls 33 become disengaged from the rear edge of the first blank and return to their starting position and engage the next blank. In the mean time the second set of pawls 33 engage the partly formed blank 35 and feed the same from the first set to the second set of rollers which bend the blank 35 into the form 36, Fig. 17, while the second blank is being fed to the first set of rollers. During continued reciprocations of the carriage 28, the blanks are being continuously fed from the apron 26, and the partly formed blanks are fed successively to the different sets of rollers. When the first blank has been operated on by the last set of rollers and bent into the form 38, Fig. 17, the second blank has been operated on by the next to the last set of rollers into the form 37, etc. The partly formed can body 38 is fed during the reciprocations of the carriage 28 by the pawl 33 at the front end of the slide 32, Fig. 6, between the die members 40 and 41, past the spreader 48, and upon the operation of the plunger 46, the intermediate part of the partly formed can body is bent and the can body is in the form shown at 39, Fig. 17.

The die member 40 and associated parts are carried by, and formed integral with, a member 49 extending lengthwise of the machine for supporting the can bodies during the fluxing, preheating, soldering and cooling operations, this member for convenience being called a horn. This horn is supported at one end by the carriage 6, Fig. 5.

The can body is fed along the horn 49 as hereinafter described, from the die 40 and its lapped edges 44 and 45 are successively treated with a suitable flux, are preheated as by jets 50, and are soldered as by a soldering iron 51. The can bodies are thereafter fed along the horn in order that the solder may set, and then dropped off the end of the horn on a suitable conveyer or other means. The fluxing means, the preheating jets and the soldering iron constitute no part of this invention, and may be of any desirable form, size and construction, and as the operations of these parts are common in can making machines, it is thought that further description herein is unnecessary. The feature of the preheating and soldering operations that is of importance in connection with this machine, is that they are effected at one locality on the horn 49, and not at a plurality of points as when a conveyer composed of links or trucks is used, all of which links or trucks must be successively heated.

The means for feeding the can bodies along the horn 49 comprises sets of gripping elements reciprocating in opposite directions, one set of elements being in position to grip the can bodies when moving in one direction while the other set of elements is out of gripping position and is moving in the opposite direction to get a new hold.

More specifically, the feeding means includes sliding elements 52 and 53 associated with the horn 49 and gripping elements 54 and 55 coacting respectively with the slides, and means for actuating the slides and the gripping elements. The slides 52 and 53 are here shown as working side by side in a channel 56 extending lengthwise of the horn on the upper side thereof, Figs. 3, 11, 13 and 14, the slides having surfaces flush with, and forming continuations of, the periphery of the horn 49.

The gripping elements 54 and 55 are arranged lengthwise of the horn and are arranged in sets, the members of each set 54 or 55 moving in unison, and the sets 54 or 55 reciprocating in opposite directions. The elements 52, 53 and 54, 55 have relative movement toward and from each other and in this form of my invention, the elements 54 and 55 rock about axes into and out of coaction with the slides 52, 53 respectively, one of said elements 54 or 55 rocking in one direction into operative position just before the other set begins to rock in the opposite direction out of operative position. The sets of gripping elements 54, 55 are mounted respectively on axially movable rock shafts 57, 58 which extend parallel to the horn 49 on one side of the machine and which are actuated from a main power shaft as hereinafter described.

The rock shafts 57 and 58 are connected respectively to the slides 52 and 53 to actuate said slides by suitable means as yokes 59, 60, Figs. 3 and 11, these yokes being connected to the rock shafts to slide therewith but to permit the rocking movement of such shafts relatively to the yokes. The spreader 48, Fig. 1, previously referred to, is for the purpose of holding the partly formed can body open while it is passing these yokes 59, 60.

The means for actuating the various movable parts of this machine comprises a main power shaft and power-transmitting connections between said shaft and the slide or carriage 28, the plunger 46 and the rock shafts 57 and 58.

61 is the main power shaft suitably supported in the bed of the machine and having a driving pulley 62 thereon and also having a gear wheel 63, Fig. 1, and an eccentric cam 64, Fig. 2, thereon. The power-transmitting means between this shaft 61 and the feeding carriage 28 comprises an oscillating arm 65, Figs. 1 and 2, pivoted at one end at 66 to the frame 1 and pivoted at its other end, Figs. 1 and 7, to a link 67 which is connected at 68 to the under side of the carriage 28, and a link 69 connected to said oscillating arm 65 and having a strap 70, Fig. 2, extending around the cam 64.

The means for actuating the plunger 46 of the head 41 which together with the die member 40 performs the last operation in the forming of the can body, comprises a suitable means as a cam 71, Figs. 2 and 16, mounted on a shaft 72 supported by the bed 1 of the machine, the cam having diametrically disposed high points 73 which coact with one arm of a bell crank lever 74 pivoted at 75 at its angle to the frame 1, the other arm of said lever engaging the lower end of the plunger 46 and pressing the same upwardly against the action of a suitable returning spring 76, Figs. 2 and 11.

The power-transmitting means between the power shaft 61 and the rock shafts 57 and 58 to move the same axially includes a gear wheel 77, Fig. 1, mounted on the shaft 72, and meshing with the gear 63 on the power shaft 61, movable power-transmitting parts 78, 79, Figs. 1 and 15, a link 80 connected to an eccentric pin 81 on the gear wheel 77 and to the power-transmitting part 79, and means for transmitting and reversing the movement of the part 79 relative to the part 78. The parts 78 and 79 are provided respectively with yokes or forks 82, 83, Fig. 15, which engage in circumferential grooves in collars 84 and 85 provided respectively on the rock shafts 57 and 58.

The power-transmitting part 79 is in the form of a cross head having a bearing 86 which slides rectilinearly along a guide rod 87, Figs. 1 and 15, fixed to the frame or bed 1, and the part 78 is a lever pivoted at 88 between its ends to the frame or bed 1 and having its upper end connected to the rock shaft 57 and its lower end connected by a link 89 to the lower end of the cross head 79. Thus the movement of the cross head 79 is reversed through the lever 78 so that the rock shafts 57 and 58 slide in opposite directions.

The power-transmitting means between the power shaft 61 and the rock shafts 57 and 58 to rock said shafts comprises a cam 90, Figs. 2 and 16, mounted on the shaft 72 and having a high surface extending a little more than half way around said cam, vertically moving slides 91 and 92, Figs. 1 and 13, having horizontal slots 93 and 94 for receiving respectively rock arms 95 and 96 provided on the rock shafts 57 and 58 respectively, and rock shafts 97 and 98 journaled in the bed 1 and extending transversely thereof, each rock shaft 97, 98 having arms 99, 100 arranged at an angle to each other, the arm 99 of each shaft being pivoted at 101 to one of the slides 91 or 92 and the other arm 100 having means as a roller 102 for coacting with the cam 90. The arms 99 extend in opposite directions from their shafts 97, 98 and owing to the arrangement of the arms 99 and to the fact that there is but one high surface on the cam 90 but one of the shafts 97 or 98 is operated at a time to raise its corresponding slide 91 or 92, and hence the gripping elements 54 and 55 on the shafts 57 and 58 respectively, are alternately moved into position to grip the can body on the horn 49, and owing to the fact that said high surface extends a little more than half way around the cam 90, the shafts 57, 58 are not rocked simultaneously but successively so that one set of gripping elements 54 or 55 does not let go or release until the other set of gripping elements has taken a new hold.

In operation, the flat blanks are placed on the table 26 and are carried by the reciprocating carriage 28 between the successive sets of rollers 2, 3 to the die members 40 and 41 where the last forming operation is completed previous to the soldering. The can body is then held by a portion of the gripping means as one arm 54 or 55 and one slide 52 or 53, and is passed along the horn and treated with a fluxing fluid, after which owing to the reciprocations and the rockings of the shafts 57 and 58, a new set of gripping elements 54 or 55 coacting with the other of the slides 52 or 53 grips the can body and slides the same to the preheating jet from whence by similar operations due to the reciprocations and rocking of the shafts 57 and 58, the can body is fed to the soldering iron, Figs. 1 and 3, and thence along the horn 49 and off the end of the same. When passing off the end, the can rides up an inclined face 103 at the discharging end of the machine, the can bodies passing between a concave roller 104 at the discharge end of the machine and a convex roller 105 on the horn, the rollers 104 and 105 serving as a support for one end of the horn.

What I claim is:

1. A can body making machine comprising a guide for receiving the completely formed can bodies, means for feeding the can bodies along the guide, said means comprising a pair of reciprocating elements movable in opposite directions, one being operable to clamp the can bodies and to move the same in one direction while the other is disengaged from the can bodies and is moving in the opposite direction to again clamp the can body, substantially as and for the purpose described.

2. A can body making machine comprising a guide for receiving the completely formed can bodies, means for feeding the can bodies along the guide comprising rocking and axially movable elements for coacting with the can bodies on the guide, means for reciprocating said elements axially in opposite directions, one moving in one direction while the other is moving in the opposite direction, and means for rocking the elements at the ends of their movements, the rocking means operating to move each element out of engagement with a can body on the guide at the end of the movement of said element in one direction and into engagement with another can body on the guide at the end of its movement in the other direction, one rock shaft rocking in one direction while the other is rocking in the opposite direction, substantially as and for the purpose set forth.

3. A can body making machine comprising a guide for receiving the completely formed can bodies, and means for feeding the can bodies along the guide comprising a reciprocating slide associated with the guide, and arranged to engage the inner sides of the can bodies, and parts for pressing the cans against the slide, said parts being movable with the slide, substantially as and for the purpose specified.

4. A can body making machine comprising a guide for receiving the completely formed can bodies, means for feeding the can bodies along the guide comprising a reciprocating slide associated with the guide and arranged to engage the inner sides of the can bodies, a gripping element for coacting with the slide, the gripping element reciprocating with the slide, and means for reciprocating the slide and with said element, substantially as and for the purpose set forth.

5. A can body making machine comprising a guide for receiving the completely formed can bodies, means for feeding the can bodies along the guide comprising a reciprocating sliding element associated with the guide and arranged to engage the inner sides of the can bodies, an element coacting with the sliding elements and arranged to engage the outer sides of the can bodies, one of said elements having a movement toward and from the other for releasing and gripping the can bodies, means for reciprocating said elements, and means for effecting the relative movement of said elements toward and from each other, substantially as and for the purpose described.

6. A can body making machine comprising a guide for receiving the completely formed can bodies, and means for feeding the can bodies along the guide comprising reciprocating slides associated with the guide and arranged to engage the inner faces of the can bodies, gripping elements paired, and coacting respectively, with the slides and arranged to engage the outer surfaces of the can bodies, and means for reciprocating the slides and the gripping elements, and operating to move one slide and the corresponding gripping element in one direction while the other slide and gripping element is moving in the opposite direction, substantially as and for the purpose specified.

7. A can body making machine comprising a horn for receiving the completely formed can bodies, and means for feeding the can bodies along the horn comprising slides set into the horn and having surfaces thereof substantially flush with the periphery of the horn, and gripping elements paired with, and arranged to coact respectively with, the slides and being arranged to engage the outer faces of the can bodies, substantially as and for the purpose set forth.

8. A can body making machine comprising a horn for receiving the completely formed can bodies, means for feeding the can bodies along the horn comprising slides associated with the horn and arranged to engage the inner sides of the can bodies, axially movable rocking gripping elements paired with, and coacting respectively with, the slides and arranged to engage the outer sides of the can bodies, means for reciprocating the slides and the gripping elements and for rocking the same, said means operating to move one slide and its gripping element in one direction while the other slide and its gripping element is moving in the opposite direction, substantially as and for the purpose described.

9. A can body making machine comprising a guide for receiving the completely formed can bodies, means for feeding the can bodies along the guide, said means comprising axially movable rock shafts arranged on the same side of the guide and extending parallel to the guide, and means for reciprocating and rocking said shafts in opposite directions, said means operating to slide one shaft axially in one direction while the other is moving axially in the opposite direction to rock one shaft in one direction while the other is rocking in the other direction, substantially as and for the purpose set forth.

10. A can body making machine comprising a horn for receiving the completed can bodies, means for feeding the can bodies along the horn, said means comprising axially movable rock shafts arranged parallel to the horn, and means for reciprocating the shafts simultaneously in opposite directions, and for rocking the same in opposite directions at the ends of their movements in each direction, substantially as and for the purpose described.

11. A can body making machine comprising a horn for receiving the completely formed can bodies, means for feeding the can bodies along the horn comprising reciprocating slides associated with the horn and arranged to engage the inner sides of the can bodies, axially movable rock shafts arranged parallel to the horn and connected respectively to the slides to reciprocate the same, and gripping elements mounted on the rock shafts and being paired, and coacting respectively, with the slides and arranged to engage the outer faces of the can bodies, means for reciprocating the rock shafts in opposite directions relatively to each other, and means for rocking the same in opposite directions to move one gripping element to release the can body after the other element is moved into gripping engagement with another can body, substantially as and for the purpose specified.

In testimony whereof, I have hereunto signed my name in the presence of two attesting witnesses, at Syracuse, in the county of Onondaga, in the State of New York, this 17th day of Aug. 1912.

JEWELL W. VANDERVEER.

Witnesses:
S. DAVIS,
L. M. BURTON.